United States Patent [19]

Brownscombe

[11] 4,358,578

[45] Nov. 9, 1982

[54] PROCESS FOR REACTING A PHENOL WITH AN EPOXY COMPOUND

[75] Inventor: Thomas F. Brownscombe, Houston, Tex.

[73] Assignee: Shell Oil Company, Houston, Tex.

[21] Appl. No.: 295,953

[22] Filed: Aug. 24, 1981

[51] Int. Cl.$^3$ .................... C08G 59/68; C08G 59/62
[52] U.S. Cl. ..................................... 528/91; 528/89; 528/92; 528/95; 528/104
[58] Field of Search .................. 528/89, 91, 92, 95, 528/104

[56] References Cited

U.S. PATENT DOCUMENTS

| | | | |
|---|---|---|---|
| 3,334,068 | 8/1967 | McWhorter et al. | 528/89 |
| 3,477,990 | 11/1969 | Dante et al. | 528/89 |
| 3,547,881 | 12/1970 | Mueller et al. | 528/89 |
| 3,842,037 | 10/1974 | Sinnema | 528/95 |
| 3,948,855 | 4/1976 | Perry | 528/89 |
| 3,978,027 | 8/1976 | Marshall | 528/95 |

*Primary Examiner*—Earl A. Nielsen
*Attorney, Agent, or Firm*—Norris E. Faringer

[57] ABSTRACT

The instant invention provide a process for increasing the molecular weight of an epoxy resin by reacting (1) a polyepoxide containing more than one vicinal epoxy group in the molecule, preferably a normally liquid polyether of a polyhydric phenol, (2) a polyhydric phenol, (3) a catalytic amount of an alkali metal or alkaline earth metal salt of a non-nucleophilic acid, especially fluoboric acid and perchloric acid, preferably in the presence of (4) a base such as pyridine.

9 Claims, No Drawings

PROCESS FOR REACTING A PHENOL WITH AN EPOXY COMPOUND

BACKGROUND OF THE INVENTION

This invention relates to a process for reacting a phenol with an epoxy-containing compound. More particularly, the invention provides a process for increasing the molecular weight of an epoxide by reacting the epoxide with a phenol in the presence of certain "hard cation/-non-nucleophilic anion" catalysts, preferably in the presence of a base.

The preparation of higher molecular weight epoxy resins via the so-called fusion technique wherein a lower molecular weight epoxy compound is reacted with a phenol in the presence of a suitable esterification catalyst is well known. See, for example, U.S. Pat. No. 3,477,990, which is directed to precatalyzed polyepoxides containing phosphonium halides and to their reaction with phenols.

It is also known that the polyepoxide/phenolic reaction can be catalyzed by phosphines as disclosed in U.S. Pat. No. 3,547,881 and by potassium iodide as disclosed in U.S. Pat. No. 3,978,027.

While all of these fusion compositions and processes are commercially useful, each has its own shortcomings. Accordingly, there is a continuing need to find other alternative processes, especially alternative catalysts systems.

SUMMARY OF THE INVENTION

The present invention is directed to a process for increasing the molecular weight of epoxy compounds which comprises reacting an epoxide possessing at least one vicinal-epoxy group per molecule with a phenol in the presence of a "hard cation/non-nucleophilic anion" catalyst, especially the alkali metal and alkaline earth metal salts of perchloric acid or fluoboric acid.

DESCRIPTION OF THE PREFERRED EMBODIMENTS

The instant invention provide a process for increasing the molecular weight of an epoxy resin by reacting (1) a polyepoxide containing more than one vicinal epoxy group in the molecule, preferably a normally liquid polyether of a polyhydric phenol, (2) a polyhydric phenol, (3) a catalytic amount of an alkali metal or alkaline earth metal salt of a non-nucleophilic acid, especially fluoboric acid and perchloric acid, preferably in the presence of (4) a base such as pyridine.

THE POLYEPOXIDES

Although normally liquid epoxies are preferred in the present compositions, semi-solid epoxy resins as well as mixtures of solid and liquid resins are useful.

The liquid polyepoxides employed in the present invention include those compounds possessing more than one vic-epoxy group per molecule, i.e., more than one

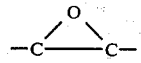

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Polyepoxides employed are monomeric or polymeric. Preferred liquid polyepoxides include the so-called liquid glycidyl polyethers of polyhydric phenols and polyhydric alcohols. As used herein the terms "epoxide equivalent weight" and "weight per epoxide" (WPE) refer to the average molecular weight of the polyepoxide molecule divided by the average number of oxirane groups present in the molecule.

Various example of polyepoxides that may be used in this invention are given in U.S. Pat. No. 3,477,990 (e.g., column 2, line 39 to column 4, line 75) and it is to be understood that so much of the disclosure of that patent relative to examples of polyepoxides is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight (WPE) between about 140 and 2,000. Especially preferred are the diglycidyl polyethers of 2,2-bis(4-hydroxyphenyl)propane having a WPE between about 140 and 500 and an average molecular weight of from about 300 to about 900.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epochlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

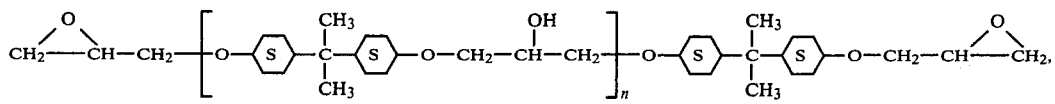

wherein n has a value so that the average molecular weight of the saturated polyepoxide is from about 350 to about 3,000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Other examples include the glycidyl novalac resins, i.e., the glycidyl phenol-aldehyde condensates, as described in U.S. Pat. No. 2,658,885.

PHENOLS

Suitable phenols include those compounds possessing at least one hydroxyl group attached to an aromatic nucleus. The phenols are monohydric or polyhydric and are substituted, if desired, with a great variety of different types of substituents. Examples of the phenols include among others, phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)pentane, and the like, and polymeric type polyhydric phenols obtained by condensing monohydric or polyhydric phenols with formaldehyde.

Preferred phenols to be used are the polyhydric phenols containing from 2 to 6 OH groups and up to 30 carbon atoms. Coming under special consideration are the phenols of the formula

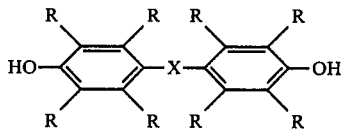

wherein X is a polyvalent element or radical and R independently is a member of the group consisting of hydrogen, halogen and hydrocarbon radicals. The preferred elements or radicals represented by X are oxygen, sulfur, —SO—, —SO$_2$—, divalent hydrocarbon radicals containing up to 10 carbon atoms and oxygen, silicon, sulfur or nitrogen containing hydrocarbon radicals, such as —OR'O—, —OR'OR'O—, —S—R'—S—, —S—R'—S—R'—S, —OSiO—, —OSiOSiO—,

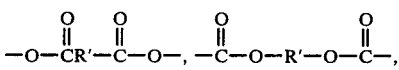

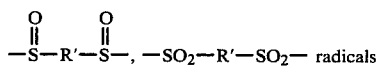 —S$O_2$—R'—SO$_2$— radicals wherein R' is a divalent hydrocarbon radical.

Various examples of phenols that may be used in this invention are also given in U.S. Pat. No. 3,477,990 (e.g., column 5, line 1 to column 6, line 10) and it is to be understood that so much of the disclosure of that patent relative to examples of phenols is incorporated by reference into this specification.

CATALYST

The catalysts which are suitable in the present process are the so-called "hard cation/non-nucleophilic anion" catalysts. Suitable catalysts which are operable in the present process are the Group I (alkali metals) and Group II (alklaine earth metals) salts of non-nucleophilic acids.

The preferred alkali metal is lithium and the preferred alkaline earth metal is calcium.

A "non-nucleophilic" acid is defined herein to mean that (1) a 10% by weight water solution has a pH of <1.0 and (2) the anion portion of the acid does not easily participate in displacement reactions with organic halides.

Suitable "non-nucleophilic" acids include fluoboric (HBF$_4$), fluoarsenic (HAsF$_6$), fluoantimonic (HSbF$_6$), fluophosphoric (HPF$_6$), perchloric (HClO$_4$) and periodic (HIO$_4$).

Accordingly, suitable hard cation/non-nucleophilic salts include LiBF$_4$, Ca(BF$_4$)$_2$, Mg(BF$_4$)$_2$, LiPF$_6$, Ca(PF$_6$)$_2$, Mg(PF$_6$)$_2$, LiSbF$_6$, LiAsF$_6$, Ca(ClO$_4$)$_2$, LiClO$_4$ and the like.

Very preferred such catalysts are LiBF$_4$, Ca(BF$_4$)$_2$, Ca(ClO$_4$)$_2$ and LiPF$_6$.

The amount of catalyst utilized will be catalytic. In general, from about 0.001 to about 10 parts per 100 parts by weight (phr) of polyepoxide is employed with from about 0.01 to about 5.0 phr being preferred, and from about 0.05 phr to about 2.0 phr being especially preferred.

In some instances, the use of a small amount of a solvent for the catalyst salt may be advantageous. Suitable solvents include water, as well as organic solvents such as the ketones, e.g., methyl ethyl ketone (MEK), methyl isobutyl ketone (MIBK), etc; glycol ethers such as ethylene glycol monoethyl ether, etc.

It has been found that the epoxy-phenoxy reaction is further improved by the addition of a suitable base. In the absence of a suitable base, the predominant reaction may be the formation of epoxy homopolymers. The base serves to modify the catalyst activity to provide selectivity of the phenoxy-epoxy reaction over homopolymerization.

Operable bases will depend upon the catalyst salt used, but include amides, aromatic amines, and aliphatic amines. Examples of operable bases are quinuclidine, pyridine, dimethylaniline, pyrrole, N-methyl-pyrrolidone, and phenanthroline.

The amount of the epoxide and the phenol to be employed in the process varies over a wide range depending upon the type of reactants and the type of product to be produced. In general, these reactants are used in approximately chemical equivalent amounts, i.e., a chemical equivalent amount of the phenol will be that sufficient to furnish one phenolic hydroxyl for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both epoxide groups, one should react one mole of the diepoxide with about 2 moles of the polyhydric phenol. If a polymeric product is desired smaller ratios should be utilized as desired, such as, for example, 4 moles of the diepoxide and 5 moles of the polyhydric phenols.

Superior results are obtained when the higher molecular weight resins are produced and in this case the ratios of reactants are varied depending upon the molecular weight desired and upon the type of end groups, i.e., whether the product is to be terminated with an epoxide or with a phenol.

An especially preferred phenolic hydroxy ether resin having an epoxide equivalent weight of between about 2,000 and about 4,000 is obtained by reacting 2,2-bis(4-hydroxyphenyl)propane with the diglycidyl ether of 2,2-bis(4-hydroxyphenyl)propane having an epoxide equivalent weight between about 140 and 500 containing from about 0.05% to 0.5% by weight of a hard cation metal salt catalyst such as, preferably $LiBF_4$, $Ca(BF_4)_2$ or $Ca(ClO_4)_2$.

The reaction is conducted in the presence or absence of solvents, and/or base diluents. In most cases, the reactants are liquid and the reaction is easily effected without the addition of solvents or diluents. However, in some cases, where either or both reactants are solids or viscous liquids it is desirable to add diluents to assist in effecting the reaction. Examples of such materials include the inert liquids, such as inert hydrocarbons as ketones (MEK, MIBK, etc.), xylene, toluene, cyclohexane, glycol ethers and the like. A basic liquid such as pyridine may also be employed as a solvent or cosolvent.

If solvents are employed in the reaction and the resulting product is to be used for coating purposes, the solvent is typically retained in the reaction mixture. Otherwise, the solvent is removed by any suitable method such as by distillation or the like.

When it is desired to produce phenolic hydroxy ethers of higher viscosities but not higher epoxide equivalent weights, the polyepoxide and phenol are subjected to thermal bodying prior to the addition of the catalyst. "Thermal bodying" refers to heating the polyepoxidephenol mixture at specified temperatures and times prior to adding the catalyst. A preferred thermal bodying treatment comprises heating the polyepoxide mixture to a temperature of between about 120° C. and 200° C., preferably between about 145° C. and about 165° C., for between about 15 minutes and 60 minutes.

The products obtained by the above process are the desired phenolic hydroxy ether compounds. Their physical characteristics depend upon the desired reactants and proportions. In general, the products vary from liquids to solids, and in the case of the high molecular weight resins vary from viscous liquids to hard solids. The products possess at least one alcoholic hydroxyl group formed by each reaction of the epoxide and phenolic hydroxyl group, and can be further reacted through this group or groups. The polyfunctional reactants also give products terminated in phenolic hydroxyl groups and/or epoxy groups, and these are available for further reaction.

A group of products which are particularly outstanding are those resins and polymers obtained by the reaction of the precatalyzed polyepoxides and polyhydric phenols in controlled proportions. Those which use an excess of the polyepoxide are terminated in epoxy groups and can be used as polyepoxides in known reactions of polyepoxides and curing agents and the like. These high molecular weight polyepoxides are particularly useful in preparing surface coatings, adhesive, laminates, filament windings, coatings for highways and airfields, structural applications, formation of foams and the like. Those prepared from the halogenated polyhydric phenols are particularly useful as flame proofing resins for forming laminates, coatings and the like. As stated earlier, the present invention is particularly useful for preparing epoxy resins to be used as coatings for the packaging and storing of foodstuffs.

CURING OF THE EPOXY CONTAINING, PHENOLIC HYDROXY ETHER COMPOUNDS

The epoxy-containing, phenolic hydroxy ether compounds obtained by use of the present invention are reacted with various conventional curing agents to form hard insoluble, infusible products. Examples of suitable curing agents include, among others, the polybasic acids and their anhydrides such as the di, tri- and higher carboxylic acids; those acids containing sulfur, nitrogen, phosphorus or halogens; amino-containing compounds such as, for example, diethylene triamine and pyridine; polyamides containing active amino and/or carboxyl groups; and others.

A number of suitable curing agents is disclosed in U.S. Pat. No. 3,477,990, and so much of the disclosure relative to epoxy curing agents is incorporated herein by reference.

The amount of curing agent varies considerably depending upon the particular agent employed. For the alkalies or phenoxides, 1% to 4% by weight is generally suitable. With phosphoric acid and esters thereof, good results are obtained with 1 to 10% by weight added. The tertiary amine compounds are preferably used in amounts of about 1% to 15% by weight. The acids, anhydrides, polyamides, polyamines, polymercaptans, etc., are preferably used in at least 0.8 equivalent amounts, and preferably 0.8 to 1.5 equivalent amounts. An equivalent amount refers to that amount needed to give one active hydride (or anhydride group) per epoxy group.

Solvents or diluents are sometimes added to make the composition more fluid or sprayable. Preferred solvents or diluents include those which are volatile and escape from the polyepoxide composition before or during cure such as esters, chlorinated hydrocarbons and the like. To minimize expense, these active solvents are often used in admixture with aromatic hydrocarbons such as benzene, toluene, xylene, etc. and/or alcohols such as ethyl, isopropyl or n-butyl alcohol. Solvents which remain in the cured compositions are used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials are also added to the composition as desired. These include other types of polyepoxides such as described in U.S. Pat. No. 3,477,990. Also included are fillers, such as sand, rock, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure varies depending chiefly on the type of curing agent. The amino-containing curing agents generally cure at or near temperature and no heat need be applied. The acids, anhydrides, and melamine derivatives, on the other hand, generally require heat, such as temperatures ranging from about 65° C. to about 210° C. Preferred temperatures range from about 90° C. to about 210° C. and more preferably from about 120° C. to 195° C.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

PACM-20 is a 100% isomeric mixture of 4,4'-di(cyclohexylamino)methane containing 20% of the trans, trans isomer, which mixture may be made by the hydrogenation of methylene dianiline.

TMA is trimellitic anhydride.

BPA is Bisphenol A, 2,2-bis(4-hydroxyphenyl)propane.

Epoxy Resin A is a liquid glycidyl polyether of 2,2-bis(4-hydroxyphenyl)propane having an epoxide equivalent weight (WPE) of about 175–180 and an average molecular weight of about 350–360.

EXAMPLE I 3.8 grams of BPA, 6.2 grams of Epoxy Resin A, and 0.1 grams of $Ca(ClO_4)_2 \cdot 6H_2O$ [0.062 g of $Ca(ClO_4)_2$] were heated at 150° C. for 28 minutes. The resulting fusion resin was fluid at 150° C., but was solid at 20° C. and could be easily remelted. The fusion resin had a WPE of about 500 and an average molecular weight of about 1,000, and when cured with a stoichiometric quantity of PACM-20 or TMA, a hard, infusible cured product insoluble in organic solvents was obtained in each instance.

EXAMPLE II

The procedures of Example I were essentially repeated except that an equivalent amount of $Ca(SCN)_2$ was used in lieu of $Ca(ClO_4)_2 \cdot 6H_2O$. No significant amount of solid epoxy resin was obtained after several hours at 150° C., thus indicating that $Ca(SCN)_2$ is not an effective fusion catalyst.

EXAMPLE III 33.9 grams of BPA, 66.1 grams of Epoxy Resin A, 1 gram of $Ca(BF_4)_2 \cdot 4H_2O$, 1 gram of water and 1 gram of pyridine were intimately mixed together. A two-gram sample of this mixture was heated to 150° C. and exothermed to 170° C. in three minutes. A slightly yellow viscous liquid which was solid at room temperature and could be remelted at 100°–105° C. The resulting fusion resin had a WPE of about 911.

One-hundred parts by weight of this fusion resin was mixed with 6 parts by weight of PACM-20 and heated to 100° C. The resin cured in 4 to 6 minutes to a yellowish solid. The fusion resin could be also effectively cured with TMA.

EXAMPLE IV

The procedures of Example III were essentially repeated wherein the water was replaced with equivalent amounts of the following solvents: ethylene glycol monoethyl ether (OXITOL), methyl ether ketone (MEK) and dioxane. Related results were obtained, except that the fusion resin had a WPE of 2613 when OXITOL was the solvent.

EXAMPLE V

The procedures of Examples I and III were essentially repeated wherein the fusion catalyst was $LiBF_4$. Related results were obtained.

What is claimed is:

1. A process for increasing the molecular weight of an epoxy compound which comprises reacting (1) an epoxy compound containing at least one vicinal epoxy group in the molecule with (2) a polyhydric phenol, in the presence of (3) a catalytic amount of a lithium or calcium salt of a non-nucleophilic acid selected from the group consisting of fluoroboric acid and perchloric acid in the presence of (4) a base.

2. The process of claim 1 wherein the epoxy compound is a glycidyl polyether of a polyhydric phenol.

3. The process of claim 2 wherein the glycidyl polyether is a glycidyl polyether of 2,2-bis(4-hydroxyphenyl)propane.

4. The process of claim 1 wherein the polyhydric phenol is 2,2-bis(4-hydroxyphenyl)propane.

5. The process of claim 1 wherein the salt is $LiBF_4$.

6. The process of claim 1 wherein the salt is $Ca(BF_4)_2$ or $Ca(ClO_4)_2$.

7. The process of claim 1 wherein the base is pyridine.

8. The process as in claim 1 wherein the catalyst salt is dissolved in a solvent.

9. The process of claim 4 wherein the solvent is selected from the group consisting of water, ketones and glycol ethers.

* * * * *